Figure 1:
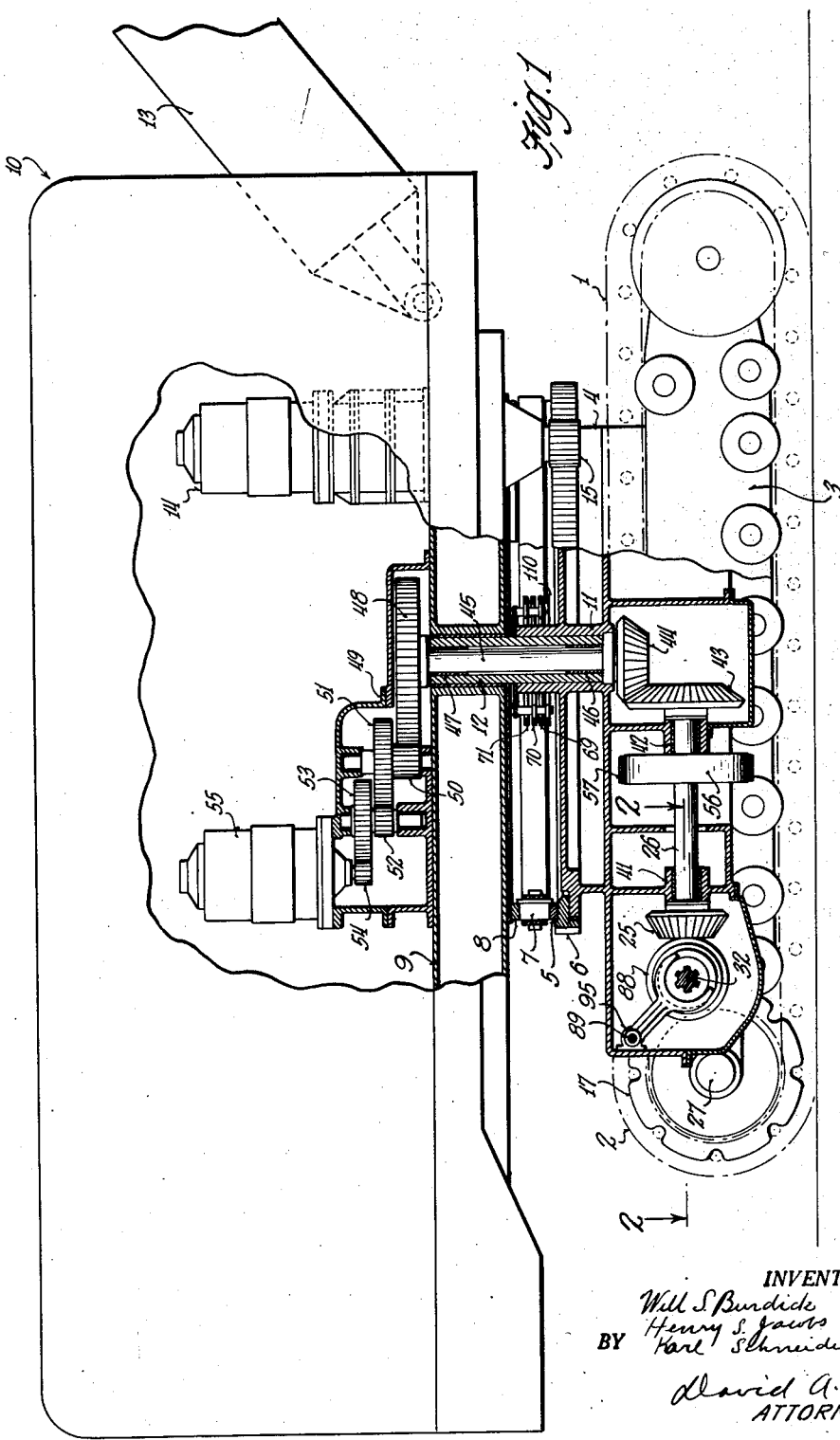

July 22, 1952 W. S. BURDICK ET AL 2,604,175
CRANE PROPELLING SYSTEM AND CONTROL THEREOF
Filed June 21, 1945 2 SHEETS—SHEET 1

INVENTORS
Will S Burdick
Henry S Jacobs
BY Karl Schneider

David A. Fox
ATTORNEY.

July 22, 1952 W. S. BURDICK ET AL 2,604,175
CRANE PROPELLING SYSTEM AND CONTROL THEREOF
Filed June 21, 1945 2 SHEETS—SHEET 2

INVENTORS
Will S. Burdick
Henry S. Jacobs
BY Karl Schneider

David A. Fox
ATTORNEY.

Patented July 22, 1952

2,604,175

UNITED STATES PATENT OFFICE 2,604,175

CRANE PROPELLING SYSTEM AND CONTROL THEREOF

Will S. Burdick, Wauwatosa, Henry S. Jacobs, Milwaukee, and Karl Schneider, Greendale, Wis., assignors to Harnischfeger Corporation, Milwaukee, Wis., a corporation of Wisconsin Application June 21, 1945, Serial No. 600,812

4 Claims. (Cl. 180—6.58)

This invention relates to propelling systems and controls therefor for traveling base power excavators, cranes and the like, hereinafter called cranes, being of particular usefulness in machines of this character in which a so-called full revolving cab is employed. The invention resides in an apparatus of this type in which a permanent driving connection between one of the two base treads and a propelling power source is maintained at all times, the other tread being arranged to be alternatively locked to form a pivot for steering or connected to said propelling power source for traveling motion, and in which an independent brake operable to arrest motion of said propelling power source is provided. Moreover, the invention sometimes resides in apparatus of this character in combination with certain controls in which the propelling power source includes a reversible motor mounted on the revolving cab and permanently joined by transmission gearing with at least one of the treads.

The common form of self-propelled traveling crane comprises a propelling base formed of a carbody mounted on a pair of endless treads disposed one on each side of the carbody. Mounted on the carbody and arranged for revolving motion is a deck and a cab from which the lifting boom or other work instrumentality extends. Carried on the cab deck are the necessary mechanisms by which the work functions of the machine are produced. Usually the motor or other prime mover, which is relied upon to produce the traveling motion of the base treads, is mounted on the deck and arranged to be connected through transmission gearing extending into the carbody and thence to the treads. Heretofore in all such systems provision has been made for disconnecting such transmission gearing when revolving motion of the cab is desired. When the transmission is thus disconnected, control of the propelling of the apparatus is lost and this loss of control gives rise to certain hazards. Through the apparatus of this invention continuous control is maintained at all times and the hazards heretofore prevailing have been eliminated.

This invention is herein described by reference to the accompanying drawings which form a part hereof and in which there is set forth by way of illustration and not of limitation one form in which the apparatus of this invention may be embodied.

Figure 2:
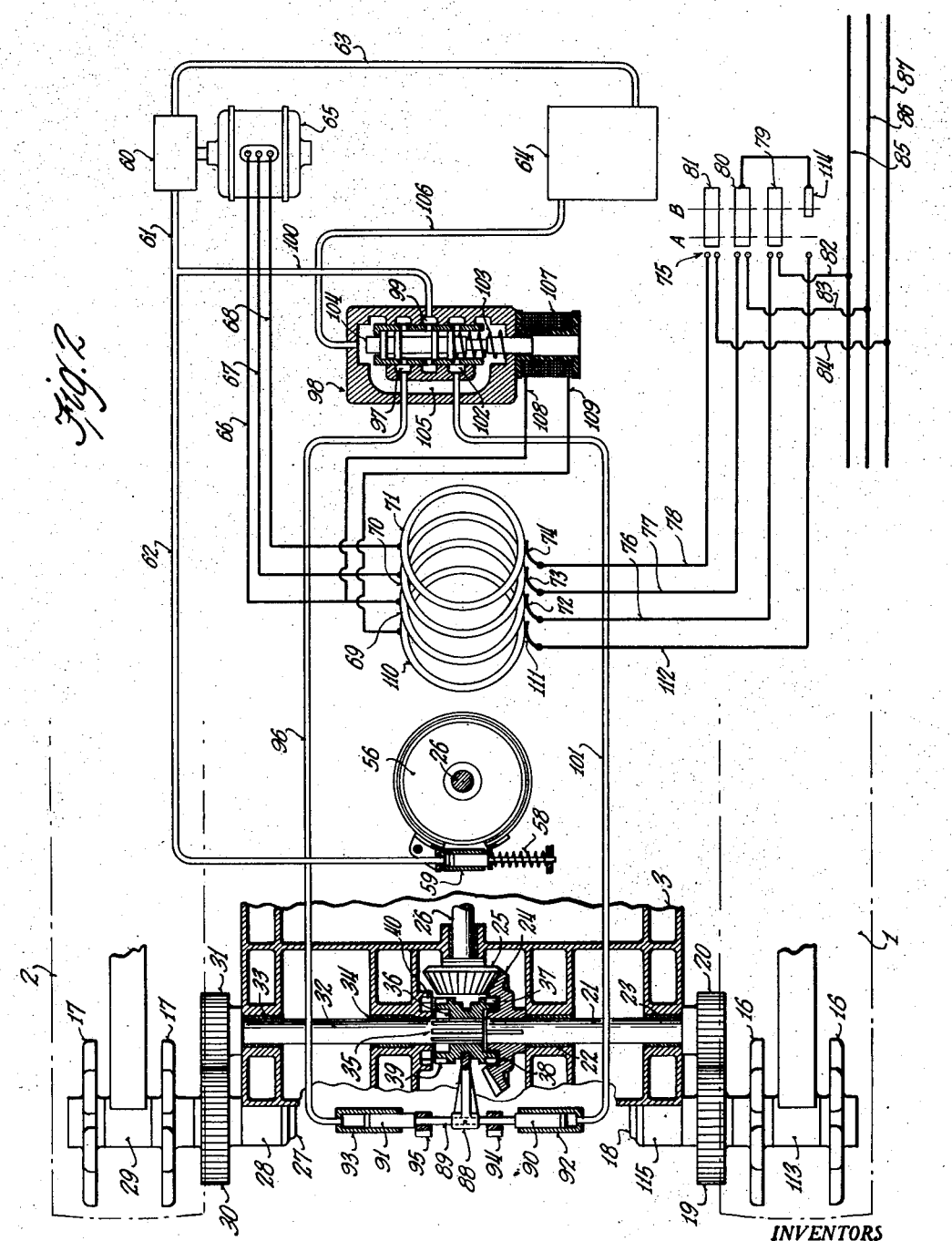

In the drawings:

Fig. 1 is a side view in elevation with parts broken away and in section of one form of the apparatus of this invention; and Fig. 2 is a fragmentary top plan view in section viewed through the plane 2—2 indicated in Fig. 1 joined with a diagrammatic showing of the control system used in connection therewith.

As shown in Fig. 1 the apparatus of this invention is embodied in a revolving cab crane having supporting treads 1 and 2 shown in outline only which are mounted upon and serve as the support for a carbody 3. Extending upwardly from the carbody 3 is a pedestal 4 bearing an upwardly facing roller ring 5 surrounded by a swing gear 6. Supported upon the roller ring 5 is a race composed of a plurality of rollers 7, which in turn form the support for an upper roller ring 8 which bears the weight of the deck 9 of the revolvable cab 10.

Centrally disposed with respect to the roller ring 5 and extending vertically from the pedestal 4 is a center gudgeon supporting sleeve 11 which carries and rigidly supports a hollow gudgeon pin 12. The cab 10 and its deck 9 are thus supported and guided for full revolving movement on the carbody 3 and a boom 13 or other work instrumentality supported on the deck 9 can be swung to any position desired. In order to produce swinging movement a swing motor 14 mounted on the deck 9 is connected through transmission gearing not shown with swing pinion 15.

Treads 1 and 2 are made up of a plurality of interconnected shoe elements arranged to be engaged and driven by double propelling sprockets 16—16 and 17—17, respectively. Sprockets 16—16 are mounted for rotation with and upon stub shaft 18 which is rotatably mounted in bearings 113 and 115 in the carbody 3. Also mounted upon shaft 18 for rotation therewith is a final reduction gear 19 which is disposed in driven meshing relationship with a final reduction pinion 20. Pinion 20 is mounted upon and keyed to a sub-axle shaft 21 carried in bearings 22 and 23. Keyed to the opposite end of shaft 21 is a bevel gear 24 which in turn is in meshing engagement with a bevel pinion 25 secured to the end of a forwardly extending propeller shaft 26.

Sprockets 17—17 are similar in form to sprockets 16—16 and are mounted upon a stub shaft 27 for rotation therewith the latter being carried in bearings 28 and 29 provided therefor in the carbody 3. A final reduction gear 30 secured to and mounted upon the shaft 27, is disposed in meshing engagement with a final reduction pinion 31. The final reduction pinion 31 is secured to the end of a sub-axle shaft 32 carried in bearings 33 and 34 in the carbody 3. The opposite end of shaft 32 is splined as indicated at 35 and carries in axially slideable, splined engagement therewith, an internal dog clutch member 36.

The internal dog clutch member 36 is provided with a peripherally toothed portion 37 adapted for meshing engagement with a corresponding external dog clutch member 38 formed in the bevel gear 24. With the parts in the position shown in Fig. 2 internal dog clutch member 36 through the part 37 is in driven engagement with the gear 24 so that upon rotation of the bevel pinion 25 treads 1 and 2 are driven in unison, thus permitting straight, forward or reverse movement of the apparatus depending upon the direction of rotation of shaft 26.

The opposite side of internal dog clutch member 36 is provided with a toothed rim 39 disposed so as to meshingly engage an external dog brake member 40 integrally formed as a part of the carbody 3 when member 36 is shifted from the position in which it is shown in Fig. 2 to the opposite position. When the member 36 is in engagement with the dog brake 40, shaft 33 and, as a consequence, tread 2 is positively held against motion while tread 1 is free to be moved either forwardly or backwardly by rotation of shaft 26. In this way steering of the apparatus is permitted, since either a right hand or a left hand turn may be made at will depending upon the direction of rotation of shaft 26. In executing such a steering movement the tread 2, being stationary, acts, as it were, as a pivot around which tread 1 may travel.

Shaft 26 is mounted for rotation in bearings 41 and 42 provided therefor in carbody 3, and carries rigidly secured thereto at its opposite end a bevel gear 43. The gear 43 in turn is in meshing engagement with a bevel pinion 44 secured to the end of a drop shaft 45 journalled in bearings 46 and 47 mounted within the hollow gudgeon pin 12. The upper end of drop shaft 45 extends above the top of deck 9 to a rigid engagement with a main propelling gear 48 mounted in a housing 49. Also contained within the housing 49 in driving relationship with gear 48 is a constantly meshed train of reduction gearing composed of pinion 50, gear 51, pinion 52 and gear 53. Gear 53 is in turn in meshing engagement at all times with pinion 54 secured to the shaft of a reversible propelling motor 55.

It may be observed that the complete transmission train from motor 55 to tread 1 is permanently engaged so that motor 55 may be operated at any time to control the movement of this tread and if the member 36 be in the position shown in Fig. 2, to control the movement of both treads in unison. Any tendency of the apparatus to "run away," or turn or "crab" on a slope (which are hazards to be avoided) can be immediately checked or controlled by the operator through control of motor 55 alone, although additional control to be hereinafter described is also provided to increase the safety of the apparatus.

The permanent engagement of the complete transmission train of the apparatus of this invention is maintained in spite of the revolvability of the cab 10 and this is rendered possible by the employment of a freely revolvable motor 55. That is to say, the motor 55 is not provided with the usual brake which arrests the shaft when no electric power is being admitted. When the cab 10 is caused to revolve through the action of motor 14 and pinion 15, pinion 50 is caused to roll about the periphery of gear 48. In spite of the very substantial driving ratio between pinion 50 and pinion 54 the shaft of motor 55 even at maximum rates of swing of cab 10 is substantially less than the normal operating speed of motor 55, since the swinging motion of cab 10 is a very deliberate motion, and the ratio of reduction between the swing gear 6 and the swing motor 14 is substantially greater than the ratio of reduction between pinion 54 and gear 48. By thus relating the ratios of reduction, as above explained, permanent and positive connection between the motor 55 and at least one of the treads may be maintained without damage to the motor 55 and without any tendency on the part of treads 1 and 2 to creep during swinging movement of the cab 10. It is even feasible to carry on both swinging and traveling movements simultaneously.

As appears more clearly in Fig. 1 a brake drum 56 is secured to the shaft 26 and is surrounded by a brake band 57. As shown in Fig. 2 the band 57 is normally applied by a spring 58 and released by a hydraulic cylinder 59. For the purpose of furnishing fluid for the actuation of cylinder 59 a positive displacement pump of any suitable form, for example, a gear pump, is provided at 60 and connected through piping 61 and 62 with the cylinder 59. The pump 60 is arranged to draw fluid through an inlet pipe 63 which joins with a fluid reservoir or sump 64. In order to operate the pump 60 an electric motor 65 of special design is preferably employed.

The motor 65 is a three phase squirrel cage type of motor, the stator of which is wound to have an exceptionally high impedance, such that the motor 65 may remain stalled with electric power applied to it for indefinite periods without destructive overheating. Such a motor will continue to rotate until resisting torque exceeds a predetermined value whereupon the motor ceases to turn while continuing to apply torque against the resistance equal to said predetermined maximum torque. A motor of this type will hereinafter be referred to for convenience as a "torque motor."

The motor 65 is mounted in any convenient location desired upon the carbody 3 and is connected by leads 66, 67 and 68 with corresponding slip rings 69, 70 and 71 which are rigidly mounted upon and surround the gudgeon pin 12 as appears more clearly in Fig. 1. Corresponding brushes 72, 73 and 74 mounted on the underside of the deck 9, but shown diagrammatically only in Fig. 2, slidingly engage the slip rings 69, 70 and 71 and provide a means by which electrical access to the motor 65 may be obtained from within the cab 10. Mounted within the cab 10 at the operator's control station, not shown, is a drum type controller 75 which is joined with the brushes 72, 73 and 74 by leads 76, 77 and 78. Commutator segments 79, 80 and 81 of the controller 75 upon movement toward closed position electrically join leads 76, 77 and 78 through leads 82, 83 and 84 with power mains 85, 86 and 87.

Upon the closing of the circuit as above described, by movement of controller 75 to the position "A" indicated in Fig. 2, motor 65 is caused to rotate drawing fluid from the reservoir 64 by means of the pump 60 and delivering it through pipes 61 and 62 to the cylinder 59 to release the brake band 57. When brake cylinder 59 reaches the limit of its movement by engagement with a stop, not shown, pressure in the hydraulic system rises until the resisting torque of pump 60 exceeds the maximum torque of which motor 65 is capable. Motor 65 thereupon stalls but continues to exert its torque and to maintain pressure in the brake cylinder 59. If for any reason leakage should occur anywhere in the system, motor 65 will resume its motion to a sufficient extent to replace such leakage while still maintaining the desired pressure in the system. Brake band 57 is thus released and maintained released as long as the controller 75 is closed, but if for any reason a power failure should occur or the controller 75 is opened, motor 65 will cease to exert its pressure maintaining torque and pump 60 will reverse hydraulically, setting the brake band 57. In this way danger of the apparatus running away on a slope can be positively controlled by the operator at any time and in case of accidental power failure is precluded automatically.

For the purpose of shifting dog clutch member 36 to select between straight line travel or steering, a shifter fork 88 in free rotational sliding engagement with a groove in the member 36, is rigidly carried upon a shifter support rod 89 slidingly mounted in guide sleeves 94 and 95 attached to the carbody 3 as shown more clearly in Fig. 1. As shown diagrammatically in Fig. 2 the ends of rod 89 are joined with hydraulic pistons 90 and 91 arranged to operate in hydraulic cylinders 92 and 93. The rod 89 and pistons 90 and 91 operate as a unit which may oscillate between the position shown in Fig. 2 and a position opposite thereto to shift the member 36 from its straight travel position to its steering position.

Fluid for the actuation of piston 91 is supplied through pipe 96 which joins with outlet port 97 of a two way solenoid actuated valve 98. Valve 98 is provided with an inlet port 99 which is joined by an inlet pipe 100 with the pipe 61. In like manner fluid for the actuation of piston 90 is supplied through pipe 101 which joins with an outlet port 102 of the valve 98.

The valve 98 is held in and normally occupies the position shown in Fig. 2 by reason of the action of spring 103 which acts upon valve piston 104 as shown. With the valve 98 in the position shown in Fig. 2 communication from port 99 to port 97 and thence to cylinder 93 is provided. Also, in this same position cylinder 92 through port 102 is in communication with exhaust passage 105 which is connected by return flow pipe 106 with the sump 64. With the motor 65 energized and pressure prevailing in the pipe 100 the dog clutch member 36 is moved to and held in the position shown in Fig. 2. Arranged to act upon the valve piston 104 is a magnet coil 107 which, when energized, shifts the valve 98 so as to admit pressure fluid into cylinder 92 and to permit the exhausting of fluid from cylinder 93.

Leads 108 and 109 are connected with the coil 107 so as to join the same with slip rings 69 and 110 mounted as previously described. A brush 111 mounted on the cab 10 engages the slip ring 110 and is connected by lead 112 with the controller 75. By movement of the controller 75 from its initially closed position designated "A" to its more remote closed position designated "B" commutator segment 114 is brought into play and electrical connection between the coil 107 and power mains 85 and 86 is established. When this occurs dog clutch member 36 is shifted so as to lock tread 2 against movement and to permit the driving of tread 1 either forwardly or in reverse depending upon the rotation of motor 55 so as to cause either a right hand or a left hand turn.

From the foregoing description it will be seen that the manner of operating the apparatus may be as follows: with the crane stationary the operator desiring to cause traveling movement first moves the controller 75 to the initially engaged position "A." In so doing brake band 57 is released. Thereupon the operator causes current to be admitted to the motor 55 by means not shown so as to drive the same either forwardly or in reverse depending upon the direction of straight travel desired. If the operator desires to cause the machine to turn to either right or left, he then moves the controller 75 to the remote position "B" and causes motor 55 to be driven in the direction necessary to cause the turn desired. At any stage of any of these maneuvers the operator may immediately open the controller 75 whereupon the brake band 57 will become set, thus making available a safety function in addition to the fact that the motor 55 remains in command of at least one of the two treads at all times.

Spring 58 is preferably chosen so as to have sufficient strength not only to positively apply brake band 57 but also to resist motion of piston 59 until hydraulic pressure substantially exceeds that required to cause shifting of pistons 91 and 92. When this is done piston 59 serves the additional function of an accumulator which stands ready to cause shifting of pistons 90 and 91 immediately upon shifting of valve 98 without waiting for motor 65 and pump 60 to get under way.

We claim:

1. In a self-propelled revolving crane having a first and second supporting and propelling endless tread, a carbody mounted thereon, a cab revolvably mounted on said carbody, the improvement in propelling and steering apparatus therefor comprising a first and a second independent tread driving means for said treads respectively mounted on said carbody, clutch means adapted normally to connect said tread driving means to be driven in unison, means associated with said carbody and adapted to lock said first tread driving means and the tread associated with it when said clutch means is disconnected, a propeller shaft drivingly connected to said second tread driving means at all times and adapted to be connected to said first tread driving means when said clutch means is connected, a reversible electric motor for operating said propeller shaft mounted on said cab, transmission gearing forming a continuously connected driving connection between said motor and said propeller shaft, and operator controlled means for causing said clutch means to be connected and disconnected and said locking means unlocked and locked whereby said second tread is prevented from being disconnected from said motor at any time and steering is permitted by driving said second tread only in either direction around said first tread as a pivot when locked.

2. In a self-propelled revolving crane having a first and second supporting and propelling endless tread, a carbody mounted thereon, a cab revolvably mounted on said carbody, the improvement in propelling and steering apparatus therefor comprising a first and a second independent tread driving means for said treads respectively mounted on said carbody, clutch means adapted normally to connect said tread driving means to be driven in unison, operator controlled means to operate the same, selective steering means adapted to lock said first tread driving means when said clutch means is disconnected, a propeller shaft drivingly connected to said second tread driving means at all times and adapted to be connected to said first tread driving means when said clutch means is connected, and a reversible electric motor continuously connected to said propeller shaft for operating said propeller shaft mounted on said cab whereby said second tread is prevented from being disconnected from said motor at any time and steering is permitted by driving said second tread only in either direction around said first tread as a pivot when locked.

3. In a self-propelled revolving crane having a first and second supporting and propelling endless tread, a carbody mounted thereon, a cab revolvably mounted on said carbody, the improvement in propelling and steering apparatus therefor comprising independent tread driving means for each of said treads mounted on said carbody, clutch means adapted normally to connect said tread driving means to be driven in unison, means associated with said carbody and adapted to lock one of said tread driving means and the tread associated with it when said clutch means is disconnected, and a continuously connected reversible electric power source including a shaft drivingly connected to the other of said tread driving means at all times.

4. In a control apparatus for a self-propelled vehicle having movable treads the combination comprising an electrically energized source of mechanical power, transmission means adapted to form driving connections between said power source and said treads simultaneously or with one of them singly, shifting means adapted to be shifted to cause selection of said driving connections, a normally applied brake adapted to arrest movement of said transmission means, a pressure responsive fluid actuated means adapted to release said brake, a pump, an electric torque motor drivingly connected with said pump, means forming a connection between the discharge of said pump and said fluid actuated brake releasing means, a fluid actuated motor adapted to occupy selective positions corresponding to the selective positions of said shifting means and operatively connected thereto to move the same to and from said positions, means forming a hydraulic connection between the discharge of said pump and said fluid actuated motor including flow directing means adapted to cause selection of the position to be occupied by said motor when fluid under pressure is being supplied by said pump, and operator controlled means adapted to admit and interrupt a supply of energizing current to said torque motor from a common energizing current source through which said electrically energized power source is also energized and to regulate said flow directing means to cause selection of said driving connections.

WILL S. BURDICK.
H. S. JACOBS.
KARL SCHNEIDER.

REFERENCES CITED

The following references are of record in the file of this patent:

UNITED STATES PATENTS

| Number | Name | Date |
|---|---|---|
| 1,602,562 | Armstrong | Oct. 12, 1926 |
| 1,611,701 | Wilson | Dec. 21, 1926 |
| 1,705,269 | Sechrist | Mar. 12, 1929 |
| 1,765,739 | Rauch | June 24, 1930 |
| 1,778,317 | Goldman | Oct. 14, 1930 |
| 1,800,379 | Davis | Apr. 14, 1931 |
| 1,948,951 | Walker | Feb. 27, 1934 |
| 1,993,612 | Lum | Mar. 5, 1935 |
| 2,067,491 | Kingsbury | Jan. 12, 1937 |
| 2,085,040 | Post | June 29, 1937 |
| 2,121,189 | Dorward | June 21, 1938 |
| 2,134,866 | Esters | Nov. 1, 1938 |
| 2,218,258 | Ekbom | Oct. 15, 1940 |
| 2,254,083 | Nickles et al. | Aug. 26, 1941 |
| 2,266,179 | Ekbom et al. | Dec. 16, 1941 |
| 2,380,619 | Terrill | July 31, 1945 |